UNITED STATES PATENT OFFICE.

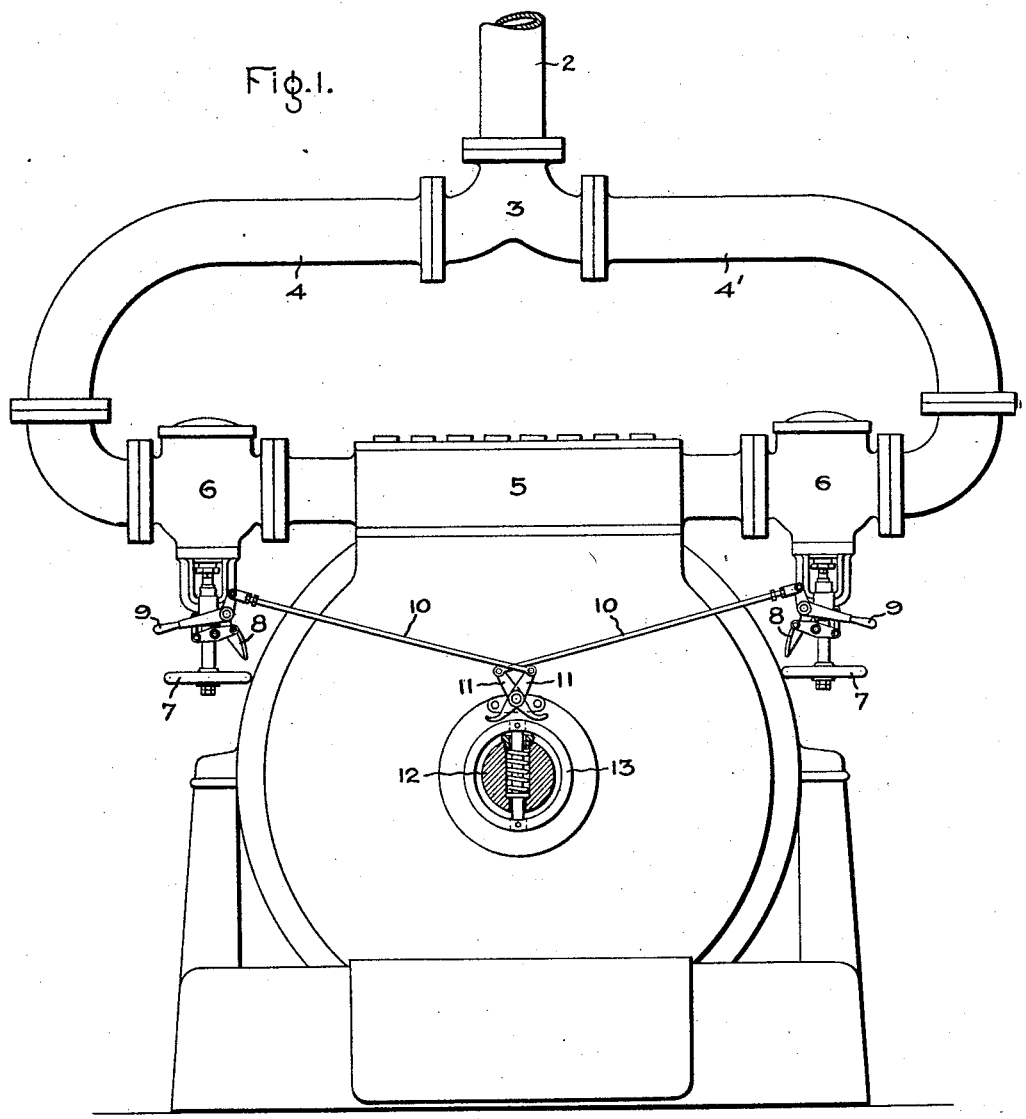
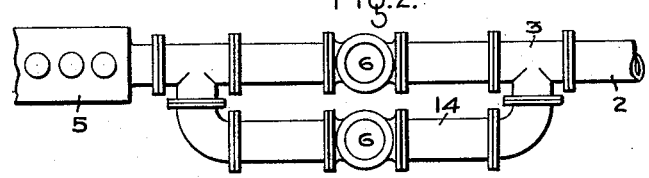

OSCAR JUNGGREN, OF SCHENECTADY, NEW YORK, ASSIGNOR TO GENERAL ELECTRIC COMPANY, A CORPORATION OF NEW YORK.

TWIN THROTTLE-VALVE FOR ENGINES.

1,110,206.

Specification of Letters Patent. Patented Sept. 8, 1914.

Application filed September 8, 1913. Serial No. 788,574.

*To all whom it may concern:*

Be it known that I, OSCAR JUNGGREN, a citizen of the United States, residing at Schenectady, in the county of Schenectady, State of New York, have invented certain new and useful Improvements in Twin Throttle-Valves for Engines, of which the following is a specification.

This invention relates to elastic fluid engines, and its object is to insure the prompt and reliable operation of the devices for shutting off the steam in an emergency. Turbines and other steam engines are customarily furnished with an emergency governor, which in case the machine attains an abnormal and dangerous speed trips the detent mechanism of a self-closing throttle valve in the steam supply main, allowing said valve to close and thereby stopping the machine. Now there are situations where an engine and especially a turbine is required to be in service continuously for months, and if the conditions are normal during all of that time, the emergency devices will not have any occasion to operate. There is thus considerable danger of the valve becoming stuck by deposits from the steam or accumulations of other foreign matter, so that when the emergency governor attempts to trip it, the valve will not close and disaster results. My invention aims to prevent any such possibility by providing two paths for the steam to reach the turbine, each controlled by its own throttle valve, so that either valve may be tested at any time without interrupting the operation of the turbine.

In the accompanying drawing, Figure 1 is an end elevation of a turbine, partly in section, embodying my invention; and Fig. 2 shows a modified arrangement of the steam main and valves.

The turbine 1 illustrated is a horizontal machine, though the invention is manifestly applicable to upright machines and also to reciprocating engines. Steam is brought through a conduit 2 which at some convenient point, say at a T coupling 3, is divided into two branches 4 and 4', connected in parallel with the steam chest 5 of the engine. In each branch pipe is located a throttle valve 6 which can be operated as a hand throttle by means of the wheel 7 when it is desired to close or open the steam pipe. The valve is also preferably provided with mechanism whereby it will be instantly closed when a catch 8 is tripped, either by the handle 9 or by a rod 10 running to a tripping lever 11 adjacent to the shaft 12. A centrifugal weight 13 on said shaft flies out and actuates the lever when the speed of the shaft rises above a predetermined speed. The two tripping levers are preferably located close together so that they will be simultaneously operated by the emergency governor; though this is not essential, as they might be arranged to operate in series. These devices are all well known in the art. For purposes of illustration I have shown in the drawing a combined hand and emergency throttle valve like that covered by the patent to Weldon, No. 932,525, while the emergency governor is similar to that shown in the Samuelson Patent No. 960,411.

In Fig. 1 the two branch pipes 4 and 4' are shown as entering the opposite ends of the steam chest 5, and the two emergency throttle valves lie on opposite sides of the turbine. If desired, however, the two valves may be arranged as shown in Fig. 2, one being in the main 2 and the other in a by-pass 14 around the first named valve. In either construction, it is evident that the engineer can operate either of the throttle valves at any time without interrupting the flow of steam to the engine, so that the machine can run continuously for an indefinite length of time, and yet the valves can be kept in perfect working order by frequent inspection and test.

In accordance with the provisions of patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is:—

1. The combination with an elastic fluid engine having a valve chest, of two supply conduits connected to the chest in parallel to each other through either of which motive fluid may pass thereto, an emergency throttle valve in each branch, and means for tripping said valves.

2. The combination with an elastic fluid engine having a valve chest, of a fluid supply conduit connected thereto and divided into two parallel branches through either of which motive fluid may pass to the engine, an emergency throttle valve in each branch, and a single emergency governor controlling both valves.

In witness whereof, I have hereunto set my hand this 6th day of September 1913.

OSCAR JUNGGREN.

Witnesses:
BENJAMIN B. HULL,
HELEN ORFORD.

Copies of this patent may be obtained for five cents each, by addressing the "Commissioner of Patents, Washington, D. C."